(12) United States Patent
Eisenhauer et al.

(10) Patent No.: US 9,909,502 B2
(45) Date of Patent: Mar. 6, 2018

(54) BATTERY CURRENT REGULATION

(71) Applicants: Mark P. Eisenhauer, Milford, CT (US); Frederick L. Bourne, Litchfield, CT (US)

(72) Inventors: Mark P. Eisenhauer, Milford, CT (US); Frederick L. Bourne, Litchfield, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 707 days.

(21) Appl. No.: 13/690,787

(22) Filed: Nov. 30, 2012

(65) Prior Publication Data

US 2014/0150446 A1   Jun. 5, 2014

(51) Int. Cl.
*F02C 7/26* (2006.01)
*F02C 7/268* (2006.01)
*H02J 7/00* (2006.01)
*H02J 7/14* (2006.01)

(52) U.S. Cl.
CPC ............ *F02C 7/26* (2013.01); *F02C 7/268* (2013.01); *H02J 7/0029* (2013.01); *H02J 7/0047* (2013.01); *H02J 7/1492* (2013.01); *H02J 2007/0039* (2013.01)

(58) Field of Classification Search
CPC .. F02C 7/26; F02C 7/262; F02C 7/264; F02C 7/266; F02C 7/268; H02J 7/0029; H02J 7/0031; H02J 7/0047; H02J 7/0032; H02J 7/0036; H02J 7/0037
See application file for complete search history.

(56) References Cited

U.S. PATENT DOCUMENTS

| | | | |
|---|---|---|---|
| 4,019,315 A * | 4/1977 | Yannone et al. | ................. 60/773 |
| 4,684,814 A | 8/1987 | Radomski | |
| 5,623,197 A | 4/1997 | Roseman et al. | |
| 5,977,645 A | 11/1999 | Glennon | |
| 6,018,941 A * | 2/2000 | Massey | ........................... 60/788 |
| 6,344,700 B1 | 5/2002 | Eisenhauer et al. | |
| 2008/0157527 A1 | 7/2008 | Jones et al. | |

* cited by examiner

*Primary Examiner* — Craig Kim
(74) *Attorney, Agent, or Firm* — Cantor Colburn LLP

(57) ABSTRACT

Embodiments are directed to an engine of an aircraft, a starter generator configured to receive power to cause the engine to start and to provide electrical power to at least one load, and a battery system comprising: a battery, and at least one of a controller and a regulator configured to limit an in-rush current to the battery following the starting of the engine.

18 Claims, 3 Drawing Sheets

BATTERY CURRENT REGULATION

BACKGROUND

An engine's acceleration profile may be analyzed or characterized. In some instances, such an analysis may be used to generally operate the engine in a low or idle state or mode of operation to obtain enhanced fuel efficiency. For example, in connection with turboshaft jet engines, an analysis may be performed to provide for an improved or enhanced specific fuel consumption (SFC), potentially at the expense of surge margin.

An engine manufacturer may choose to reduce surge margin to compensate for power loss. For example, when a starter generator is installed on a compressor of an engine, shaft power losses may reduce the engine's response to rotor load changes. Strict load limits (e.g., electrical load limits) may need to be established and adhered to in order to prevent electrical overloads. An approach to providing necessary engine starting torque while ensuring that electrical generating limits are not exceeded is to design a custom starter generator for the particular engine. In some instances, it might be difficult or undesirable to develop a custom starter generator.

BRIEF SUMMARY

An embodiment is directed to a system comprising: an engine of an aircraft, a starter generator configured to receive power to cause the engine to start and to provide electrical power to at least one load, and a battery system comprising: a battery, and at least one of a controller and a regulator configured to limit an in-rush current to the battery following the starting of the engine.

An embodiment is directed to an apparatus comprising: at least one processor, and memory having instructions stored thereon that, when executed by the at least one processor, cause the apparatus to: cause a starter generator to receive power to cause an engine of an aircraft to start, cause the starter generator to provide electrical power to at least one load, and limit an in-rush current to a battery following the starting of the engine.

A method comprising: determining, by a controller comprising a processor, a state of operation with respect to an aircraft engine, and based on the state of operation, controlling, by the controller, a distribution of current with respect to a starter generator and a battery so as to limit an in-rush of the current.

Other embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
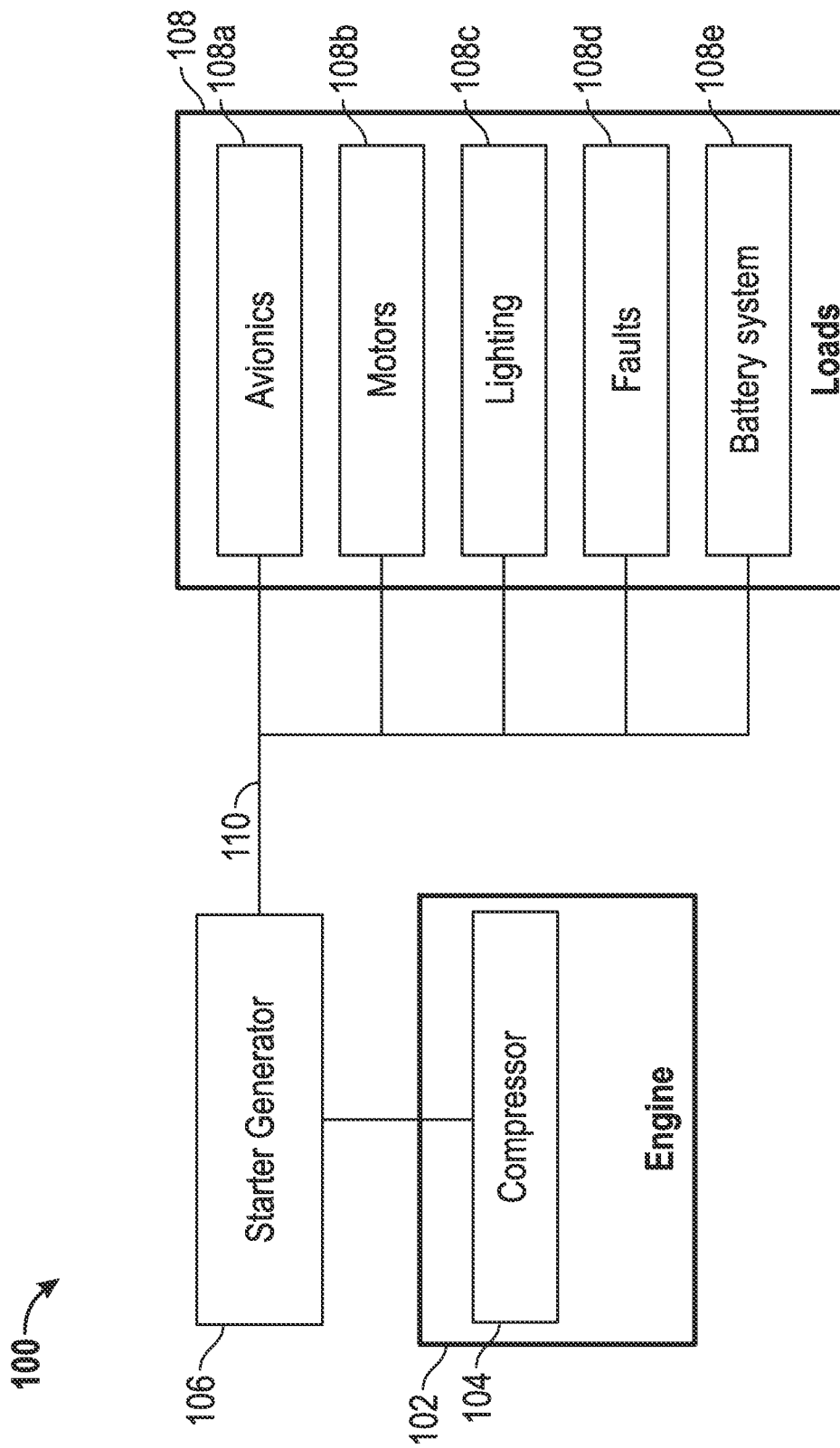
FIG. 1 illustrates an exemplary system architecture in accordance with one or more embodiments of this disclosure.

In accordance with various aspects of the disclosure, apparatuses, systems and methods are described for enhancing the operation of an aircraft. In some embodiments, a battery current regulator (BCR) may be used to control a battery charging current. The battery charging current may be controlled so as to stay within a limit (e.g., an engine installation manual limit).

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities may refer to either a direct or an indirect connection.

FIG. 1 illustrates a system 100 in accordance with one or more embodiments of this disclosure. The system 100 may include an engine 102. The engine 102 may be associated with an aircraft. Moreover, while a single engine 102 is shown in FIG. 1, in some embodiments more than one engine 102 may be included.

The engine 102 may include a compressor 104. The compressor 104 may be configured to provide the so-called "compression part" of a thermodynamic cycle of the engine 102.

A starter generator 106 may be coupled to the engine (e.g., the compressor 104). The starter generator 106 may be configured to provide power (e.g., mechanical power) to the engine 102 to start the engine. The starter generator 106 may thereby function as a starter.

Once the engine 102 is started, the engine 102 may supply power (e.g., mechanical power) to the starter generator 106, and the starter generator may convert the mechanical power into electrical power. The starter generator 106 may thereby function as a generator.

The electrical power generated by the starter generator 106 may be conveyed to one or more loads 108 via, e.g., one or more busses 110. Exemplary loads 108 are shown in FIG. 1. For example, the loads 108 may include avionics 108a, motors 108b, lighting 108c, faults 108d, and a battery system 108e. The avionics 108a, motors 108b, and lighting 108c loads may produce transients of a short duration and may be characterized as part of an electrical loads analysis (ELA). Fault loads 108d may pull the voltage associated with the generator 106 down to low levels where the real power experienced by the engine may be well below a maximum threshold or limit. The battery system 108e, however, may represent a substantial load. For example, the battery system 108e may draw significant current during a recharging cycle or operation after the engine 102 is started, or when a battery (e.g., battery 202 of FIG. 2) associated with the battery system 108e is depleted or failed.

Taken together, the loads 108 (and particularly, the battery system 108e) may be substantial enough to exceed a desired operating condition of the engine 102. Battery current may need to be regulated to levels that allow for emergency or essential loads (e.g., those loads representative of equipment needed to fly or land an aircraft), plus margin for use of optional equipment (e.g., loads representative of equipment that is not needed to fly or land an aircraft).

Figure 2:
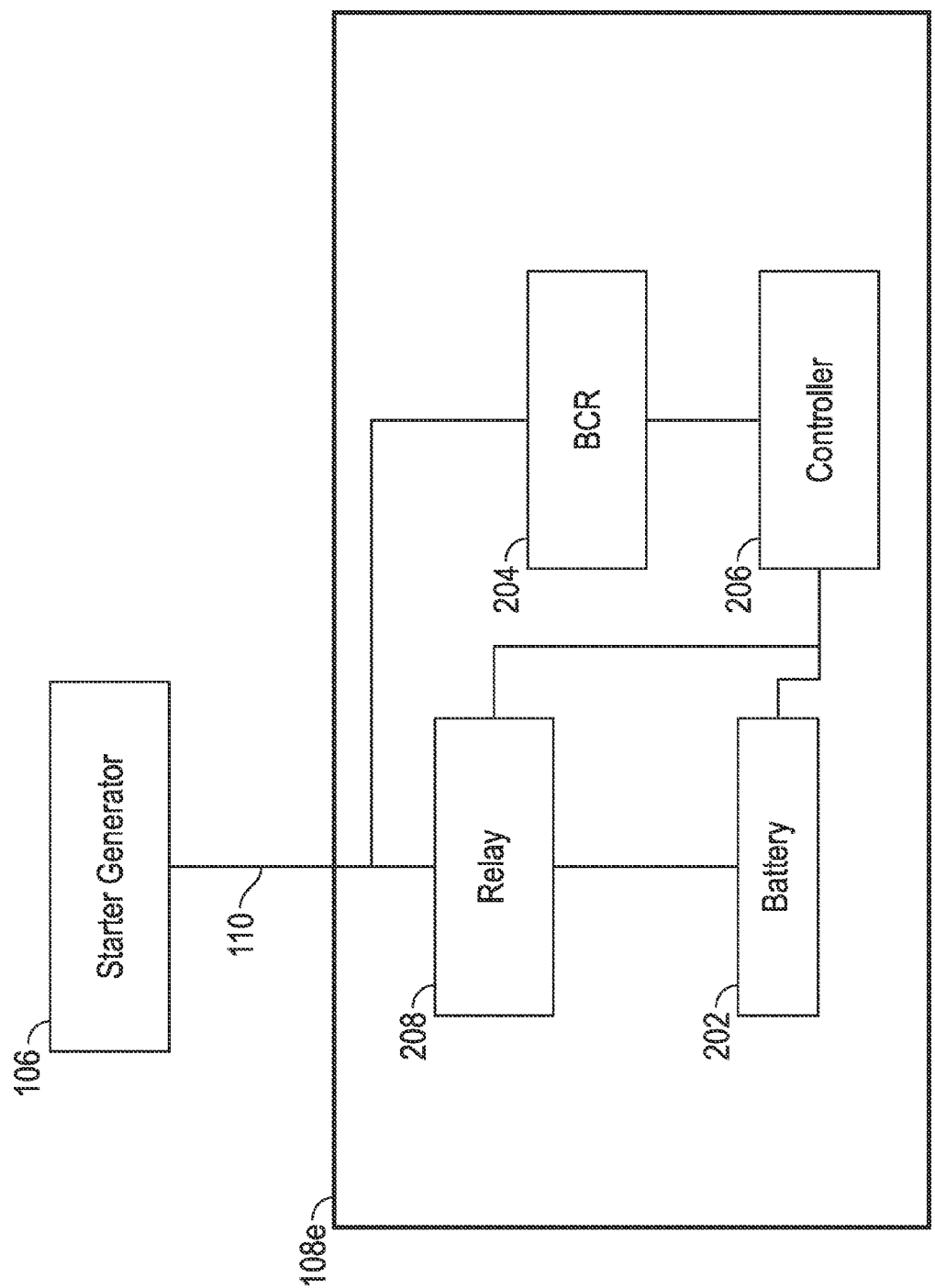
FIG. 2 illustrates an exemplary battery system in accordance with one or more embodiments of this disclosure.

Turning to FIG. 2, an exemplary embodiment of the battery system 108e is shown. The battery system 108e may include a battery 202. In some embodiments, the battery 202 may be used as a backup power source in the event that, e.g., the starter generator 106 fails to generate electrical power. In some embodiments, the battery 202 may be used to supply power to the starter generator 106 to facilitate starting the engine 102. After such a starting of the engine 102, the battery 202 may attempt to draw a large amount of current if not regulated.

The battery system 108e may include a battery current regulator (BCR) 204. The BCR 204 may include components or devices similar to that present on an aircraft onboard battery charger and/or components or devices typical of a conventional regulator. The BCR 204 may measure or monitor a current on a bus 110 coupling the battery 202 to the starter generator 106. The BCR 204 may be configured to control the current in accordance with one or more thresholds or limits associated with the engine 102 or the starter generator 106.

In some embodiments, the BCR 204 may be configured to control one or more voltages, such as a voltage supplied by the starter generator 106 that may be used to recharge the battery 202. The BCR 204 may receive signals or feedback from one or more entities, such as a controller 206. In this respect, the BCR 204 may include intelligence that might not be present in a typical regulator.

The controller 206 may be coupled to the BCR 204 as shown in FIG. 2. The controller 206 may be configured to perform one or more functions. For example, the controller 206 may be configured to cause one or more tests (e.g., one or more built-in-tests) to be performed with respect to one or more devices or entities, such as the BCR 204. The controller 206 may be configured to ensure that the battery 202 provides power to one or more devices or entities, such as the starter generator 106 during engine starting. The controller 206 may be configured to provide feedback or signals to the BCR 204 to ensure that the battery 202 is not serving as an excessive load (e.g., drawing excessive current in an amount greater than a threshold, where the threshold may be specified as a function of time). In some embodiments, the controller 206 may monitor a health status of the battery 202 and may provide the health status as an output. The output may take one or more forms, such a displayed message, text, a graphic, a sound, etc. The output may be presented on one or more interfaces or devices (e.g., a display screen, a computer monitor, a speaker, etc.).

In some embodiments, the controller 206 may be coupled to a relay 208. The relay 208 may be configured to pass a signal (e.g., a current) from the starter generator 106 to the battery 202, or vice versa. In some embodiments, the relay 208 may be, or include, a contactor. The controller 206 and the relay 208 may effectively serve to bypass the BCR 204 in some instances. For example, during emergency situations where the generator 106 fails to supply power, the controller 206 and/or the relay 208 may be configured to ignore or bypass regulation that may be provided or suggested by the BCR 204.

The arrangement of the entities and devices shown in FIG. 2 is illustrative. In some embodiments, the entities and devices may be coupled to one another in a manner that is different from what is shown in FIG. 2. In some embodiments, one or more of the components or devices may be optional. In some embodiments, additional components or devices not shown may be included.

Figure 3:
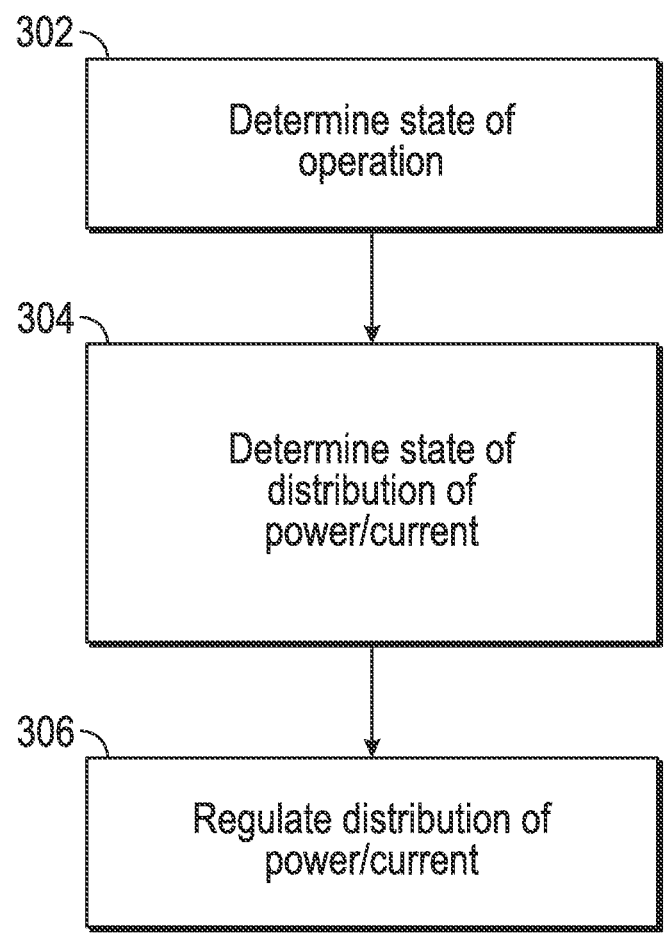
FIG. 3 illustrates a flow chart of an exemplary method in accordance with one or more embodiments of this disclosure.

FIG. 3 illustrates a flow chart of an exemplary method in accordance with one or more embodiments. The method of FIG. 3 may be executed in connection with one or more devices, components, or systems, such as those described herein. The method of FIG. 3 may be used to control a distribution of power or a flow of current.

In block 302, a determination may be made regarding a state of operation. For example, a state of operation may be determined in block 302 with respect to an engine (e.g., engine 102) or a starter generator (e.g., starter generator 106).

In block 304, a determination may be made regarding a distribution of power or current. The determination of block 304 may be based on the determination of block 302. For example, if the state of operation of block 302 indicates that the engine is being started, control may be provided such that power/current may be supplied from a battery (e.g., battery 202) or another power source to the starter generator 106. If the state of operation of block 302 indicates that the engine is already started, control may be provided such that power/current may be supplied from the starter generator 106 to the battery to (re)charge the battery or maintain the battery at a specified level.

In block 306, power distribution or current flow may be regulated or controlled. For example, when (re)charging a battery, a charging profile may be applied by a regulator (e.g., regulator 204) and/or a controller (e.g., controller 206) to ensure that the battery does not overload the generator 106 and/or the engine 102. When the battery is low on charge or is depleted, the battery may represent a large load on the starter generator 106 and/or the engine 102. In order to prevent a large in-rush of current in such a scenario, the regulator or controller may limit the amount of current at the outset. The time taken to re(charge) the battery does not necessarily need to be longer relative to not using any such limit. For example, the battery may be charged based on a substantially more constant or continuous current over the course of a charging cycle. Using a more constant or continuous current over the course of the charging cycle may help to minimize heating or damage to components (e.g., the battery), thereby potentially extending the operational life of those components.

In some embodiments, the method of FIG. 3 may execute repeatedly or iteratively as part of a loop. Such repeated execution may be used to dynamically respond to changes in one or more inputs or conditions (e.g., environmental conditions).

The blocks or operations of the method of FIG. 3 are illustrative. In some embodiments, the operations may execute in an order or sequence different from what is shown in FIG. 3. In some embodiments, one or more of the operations (or a portion thereof) may be optional. In some embodiments, additional operations not shown may be executed as part of the method.

In an exemplary ELA, the battery 202 may represent a primary 5-minute surge load. The BCR 204 may take away or remove that 5-minute surge load and reduce it to stay within a continuous limit, such that the continuous limit could (effectively) be raised to the 5-minute surge limit. For example, a generator rating of 150 amps could be "slash rated" to 150/225 amps. The transient capability of the generator might be 300 amps (e.g., based on twice the first rating number of the slash rating, or 150×2=300), and the 5-minute and continuous ratings might be 225 amps (e.g., the second rating number of the slash rating). The numbers or values used herein are illustrative. It is understood that different environments or applications may result in the use of different values or configurations.

Embodiments of the disclosure may be applied in connection with, e.g., compressor driven starter generators, brushless machines, etc. Embodiments of the disclosure may adhere to one or more regulations or standards, such as 14 CFR 29.1165(c) and/or MIL-STD-7016. For example, paragraph 3.5.4.4.3(a) of MIL-E-7016F may provide a mechanical rating for torque limitations of a mechanical drive system.

Embodiments of the disclosure may be tied to one or more particular machines. For example, a battery system may include a controller that may be configured to control a distribution of power or a flow of current. The controller may control a direction of a flow of current with respect to a battery and a starter generator. The controller may also be configured to control the amount or rate of current flow.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments of the disclosure may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments of the disclosure may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein. In some embodiments, the functionality described herein may be implemented in hardware, software, firmware, or any combination thereof.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system comprising:
a battery system comprising a battery, a controller and a regulator;
an engine of an aircraft; and
a starter generator configured to receive power from the battery to cause the engine to start and to provide electrical power to the battery system for recharging the battery during a recharging operation and at least one load,
the regulator being configured to limit an in-rush current to the battery resulting from the starter generator providing the electrical power having a substantially constant current to the battery system for the charging of the battery during the recharging operation following the starting of the engine in response to signals provided to the regulator from the controller that relate to determining whether the battery is drawing excessive current during the recharging operation in accordance with plural thresholds or limits associated with the engine or the starter generator.

2. The system of claim 1, wherein the at least one load comprises at least one of: avionics, a motor, lighting, and a fault.

3. The system of claim 1, wherein at least one of the controller and the regulator is configured to monitor a health status associated with the battery and provide an output regarding the health status.

4. The system of claim 1, wherein the starter generator is configured to receive power from the battery to cause the engine to start.

5. The system of claim 1, further comprising:
a contactor coupled to the starter generator and the battery,
wherein the contactor is configured to receive current from the starter generator and provide the current to the battery to charge the battery.

6. The system of claim 1, wherein the battery is charged during a charging cycle, and wherein a charging profile associated with the charging cycle and implemented by at least one of the controller and the regulator provides for a substantially constant current over the course of the charging cycle.

7. The system of claim 1, wherein the plural thresholds or limits associated with the engine or the starter generator comprise a charging profile.

8. An apparatus comprising:
at least one processor; and
memory having instructions stored thereon that, when executed by the at least one processor, cause the apparatus to:
cause a starter generator to receive power from a battery of a battery system comprising the battery, a controller and a regulator to cause an engine of an aircraft to start,
cause the starter generator to provide electrical power to the battery system for recharging the battery during a recharging operation and at least one load, and
limit an in-rush current to the battery resulting from the starter generator providing the electrical power having a substantially constant current to the battery system for the charging of the battery during the recharging operation following the starting of the engine in response to signals provided to the regulator from the controller that relate to determining whether the battery is drawing excessive current during the recharging operation in accordance with plural thresholds or limits associated with the engine or the starter generator.

9. The apparatus of claim 8, wherein the at least one load comprises at least one of: avionics, a motor, lighting, and a fault.

10. The apparatus of claim 8, wherein the instructions, when executed by the at least one processor, cause the apparatus to:
cause the starter generator to receive power from the battery to cause the engine to start.

11. The apparatus of claim 8, wherein the instructions, when executed by the at least one processor, cause the apparatus to:

cause the battery to be charged during a charging cycle,
wherein a charging profile associated with the charging cycle provides for a substantially constant current from the starter generator to the battery over the course of the charging cycle.

12. The apparatus of claim 8, wherein the plural thresholds or limits associated with the engine or the starter generator comprise a charging profile.

13. A method comprising:
determining, by a controller comprising a processor, a state of operation with respect to an aircraft engine; and
based on the state of operation, controlling, by the controller, a distribution of current with respect to a starter generator and a battery whereby the starter generator provides electrical power for recharging the battery during a recharging operation,
wherein the controlling comprises limiting an in-rush current to the battery resulting from the starter generator providing electrical power having a substantially constant current to a battery system, which comprises the battery, the controller and a regulator, for the recharging of the battery during the recharging operation following a starting of the engine in response to signals provided to the regulator from the controller that relate to determining whether the battery is drawing excessive current during the recharging operation in accordance with plural thresholds or limits associated with the engine or the starter generator.

14. The method of claim 13, further comprising:
determining, by the controller, that the state of operation indicates that the engine is being started; and
based on determining that the state of operation indicates that the engine is being started, causing, by the controller, current to be supplied from the battery to the starter generator.

15. The method of claim 13, further comprising:
determining, by the controller, that the state of operation indicates that the engine is already started; and
based on determining that the state of operation indicates that the engine is already started, causing, by the controller, current to be supplied from the starter generator to the battery in order to charge the battery.

16. The method of claim 13, further comprising:
causing, by the controller, a built-in-test to be performed on at least one of the battery, the starter generator, the engine and the regulator.

17. The method of claim 16, wherein the regulator is configured to control a voltage supplied by the starter generator that is used to charge the battery.

18. The method of claim 13, wherein the plural thresholds or limits associated with the engine or the starter generator comprise a charging profile.

* * * * *